(12) United States Patent
Gambioli et al.

(10) Patent No.: US 11,198,503 B2
(45) Date of Patent: Dec. 14, 2021

(54) AIRCRAFT WITH ACTIVE SUPPORT

(71) Applicant: AIRBUS OPERATIONS LIMITED, Bristol (GB)

(72) Inventors: Francesco Gambioli, Bristol (GB); Henry Edwards, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 292 days.

(21) Appl. No.: 16/210,699

(22) Filed: Dec. 5, 2018

(65) Prior Publication Data

US 2019/0176970 A1 Jun. 13, 2019

(30) Foreign Application Priority Data

Dec. 8, 2017 (GB) ..................................... 1720517

(51) Int. Cl.
*F16F 15/00* (2006.01)
*B64C 13/16* (2006.01)
(Continued)

(52) U.S. Cl.
CPC ............. *B64C 21/00* (2013.01); *B64C 5/08* (2013.01); *B64C 5/10* (2013.01); *B64C 13/00* (2013.01);
(Continued)

(58) Field of Classification Search
CPC ......... B64C 17/02; B64C 17/04; B64C 13/16; B64C 9/30
See application file for complete search history.

(56) References Cited

U.S. PATENT DOCUMENTS 4,343,447 A * 8/1982 Reed, III ................. B64D 1/04
244/118.1
4,502,652 A * 3/1985 Breitbach ................ B64D 1/02
188/267
(Continued)

FOREIGN PATENT DOCUMENTS

DE 10226241 1/2004
EP 2233395 9/2010
(Continued)

OTHER PUBLICATIONS

Oxford Language, Transducer Definition (Year: 2021).*
(Continued)

*Primary Examiner* — Richard R. Green
*Assistant Examiner* — Madison Elizabeth Dittner
(74) *Attorney, Agent, or Firm* — Nixon & Vanderhye P.C.

(57) ABSTRACT

An aircraft is disclosed having a structure at least part of which is capable of generating aerodynamic lift. A body having a mass is movably mounted to a portion of the structure by an active support. The active support includes an actuator to move the body relative to the portion of the structure, and a controller for controlling movement of the actuator in response to a dynamic input. The active support provides a range of movement for the body in at least one degree of freedom. The actuator moves the body across the entire range of movement in that one degree of freedom in a time period of less than 3 seconds. The actuator moves the body sufficiently rapidly to generate an inertial force that is equal to or greater than any aerodynamic force generated by the body during that movement of the body. The active support may be used to reduce loads on the aircraft structure.

22 Claims, 6 Drawing Sheets

(51) Int. Cl.
- *B64C 17/00* (2006.01)
- *B64C 17/04* (2006.01)
- *B64C 21/00* (2006.01)
- *G05D 1/00* (2006.01)
- *B64C 5/08* (2006.01)
- *B64C 5/10* (2006.01)
- *B64C 13/00* (2006.01)
- *F15D 1/00* (2006.01)

(52) U.S. Cl.
CPC .............. *B64C 13/16* (2013.01); *B64C 17/00* (2013.01); *B64C 17/04* (2013.01); *F15D 1/007* (2013.01); *F16F 15/00* (2013.01); *G05D 1/0066* (2013.01); *B64C 2230/00* (2013.01)

(56) References Cited

U.S. PATENT DOCUMENTS

| | | | | |
|---|---|---|---|---|
| 4,706,902 | A * | 11/1987 | Destuynder | B64C 13/16 244/76 C |
| 6,685,137 | B2 * | 2/2004 | Darbyshire | B64C 17/02 244/80 |
| 7,720,582 | B2 * | 5/2010 | Makinadjian | B64C 25/60 701/37 |
| 9,266,609 | B1 | 2/2016 | Kunz | |
| 2017/0088257 | A1 * | 3/2017 | Heverly, II | F01D 25/28 |

FOREIGN PATENT DOCUMENTS

| | | |
|---|---|---|
| EP | 2860100 | 4/2015 |
| EP | 3101504 | 12/2016 |
| JP | 04-306197 | 10/1992 |
| KR | 10-2016-0077703 | 7/2016 |
| WO | 2016/144421 | 9/2016 |

OTHER PUBLICATIONS

European Examination Report for European Application No. 18210365.5, five pages, dated Oct. 8, 2020.
"Tuned Mass Damper Systems", ConCh04v2.fm, Jul. 11, 2002, 69 pages.
Combined Search and Examination Report for GB 1720517.0 dated Jun. 8, 2018, 7 pages.
European Extended Search Report for European Application No. 18210365.5, 16 pages, dated May 28, 2019.

* cited by examiner

AIRCRAFT WITH ACTIVE SUPPORT

This application claims priority to GB 1720517.0 filed Dec. 8, 2017, the entire contents of which is hereby incorporated by reference.

FIELD OF THE INVENTION

The present invention relates to an aircraft responsive to a dynamic input, and a method of reducing loads on an aircraft structure.

BACKGROUND OF THE INVENTION

Current aircraft systems use the controlled motion of fast-acting movable flight control surfaces (e.g. ailerons and spoilers) to redistribute aerodynamic loads. These systems are commonly known as loads alleviation function (LAF) systems and typically aim to reduce the wing bending moment at the root.

More recently, LAFs have been developed which, in addition to acting to affect steady state loads (initial conditions), act to respond to dynamic loads such as those which develop during a gust encounter.

A gust LAF system reduces the effect of gust loads on the aircraft by measuring the upward acceleration of the aircraft and comparing that with the acceleration commanded by the pilot. Any discrepancy may be added as a correction signal by the flight control system to signals controlling the deflection of the control surfaces in order to counteract the accelerations caused by wind gusts, thereby also reduce the wing bending moments.

SUMMARY OF THE INVENTION

A first aspect of the invention provides an aircraft comprising a structure at least part of which is capable of generating aerodynamic lift, and a body having a mass movably mounted to a portion of the structure by an active support, wherein the active support includes an actuator configured to move the body relative to the portion of the structure, and a controller for controlling movement of the actuator in response to a dynamic input, wherein the active support is configured to provide a range of movement for the body in at least one degree of freedom, and the actuator is configured to move the body across the entire range of movement in said one degree of freedom in a time period of less than 3 seconds, and wherein the actuator is configured to move the body sufficiently rapidly to generate an inertial force that is equal to or greater than any aerodynamic force generated by the body during that movement of the body.

A further aspect of the invention provides a method of reducing loads on an aircraft structure having at least a part capable of generating aerodynamic lift, and a body having a mass movably mounted to a portion of the structure by an active support, wherein the active support includes an actuator configured to move the body relative to the portion of the structure, wherein the active support is configured to provide a range of movement for the body in at least one degree of freedom, and the actuator is configured to move the body across the entire range of movement in said one degree of freedom in a time period of less than 3 seconds, the method comprising moving the body relative to the portion of the structure in response to a dynamic input and sufficiently rapidly to generate an inertial force equal to or greater than any aerodynamic force generated by the body during that movement of the body.

The invention is advantageous in that the mass can be used to affect the dynamic response of at least the portion of the aircraft structure to which the mass is mounted so the loads developed during an event causing movement of the aircraft structure can be reduced.

The magnitude of the mass may be selected according to the intended dynamic response of the structure. For example, a relatively larger mass may be used where the dynamic response is relatively slower, whereas a relatively smaller mass may be used where the dynamic response is relatively faster.

The active support in this context is any support structure which allows flexibility or movement between the body and the structure and which movement is actively controlled by the actuator. The active support may include a spring, either within the actuator or as a separate part, acting to bias the active support to one or more positions. The active support may include a damper, either within the actuator or as a separate component, acting to dissipate kinetic energy.

The body may include one or more of: a wing tip fuel tank, auxiliary fuel tank, podded fuel tank, a main engine, an auxiliary power unit, a landing gear, a wing tip device or payload (e.g. passengers, cargo, ordnance, etc.) of the aircraft.

In one example, the invention may be used to reduce aircraft wing loads by controlling the dynamic response of a relatively heavy mass attached to the wing by the active support. In an example where the relatively heavy mass is a wing tip fuel tank the active support may reduce wing loads that may otherwise exceed a loads limit such that the wing tip tank may be fitted or retrofitted without modification to an existing wing structure.

In another example, the invention may be used in mounting the engine/pylon, or any external storage (e.g. for military applications), onto the wing to limit the load introduction into the wing-box due to the engine dynamics.

Alternatively, the invention may be used in conjunction with a folding aircraft wing-tip where the hinge between the main wing and the folding wing-tip is the active support, and the body is the folding wing-tip part outboard of the hinge.

Further alternatively, the wing tip fuel tank mounted using the active support may be used in conjunction with a relatively large wing tip device mounted onto the tip end of the wing. Fitting or retrofitting a large winglet or other wing tip device may typically require strengthening work or other modifications to the wing structure, particularly in the outboard sections of the wing. The wing tip device may be configured to generate relatively large aerodynamic and structural forces without modification to an existing wing structure, or with reduced structural modification, when used in conjunction with the wing tip fuel tank mounted using the active support. This may allow for an additional variable in the design space of the wing tip device, allowing to control inertia forces.

The dynamic input may be a signal from a sensor mounted to the aircraft.

The sensor may be one or more of: an air pressure sensor, a position sensor, an accelerometer, an air densitometer, an angle of attack vane or strain gauge.

The active support may be configured to provide a range of movement for the body in a plurality of degrees of freedom, e.g. up to six degrees of freedom. Where the active support is configured to support more than one body, the active support may be configured to provide a range of movement for the bodies in more than six degrees of freedom.

The mass of the body may be substantially constant.

The mass of the body may be substantially constant during the 3 second time period.

The mass of the body may be substantially constant for at least a duration an order of magnitude greater than the 3 second time period.

The dynamic input may be representative of an aerodynamic load or a ground load acting on the aircraft, or of an unbalanced dynamic load generated by a part of the aircraft.

The dynamic input may be an aerodynamic gust load.

The controller may be configured to provide loads alleviation for the structure of the aircraft.

The dynamic input may be an aerodynamic gust load sensed a distance in front of and/or at any point on the aircraft.

The method may provide loads alleviation for the structure of the aircraft.

Where the aircraft has a passenger cabin, and method may reduce the magnitude of external loads on the structure that are imparted to the passenger cabin.

The dynamic input may be received from a sensor forming part of a loads alleviation system coupled to one or more flight control surfaces of the aircraft.

The dynamic input may be a pilot controlled input, e.g. a pilot induced oscillation or other unfavourable pilot-vehicle interaction.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
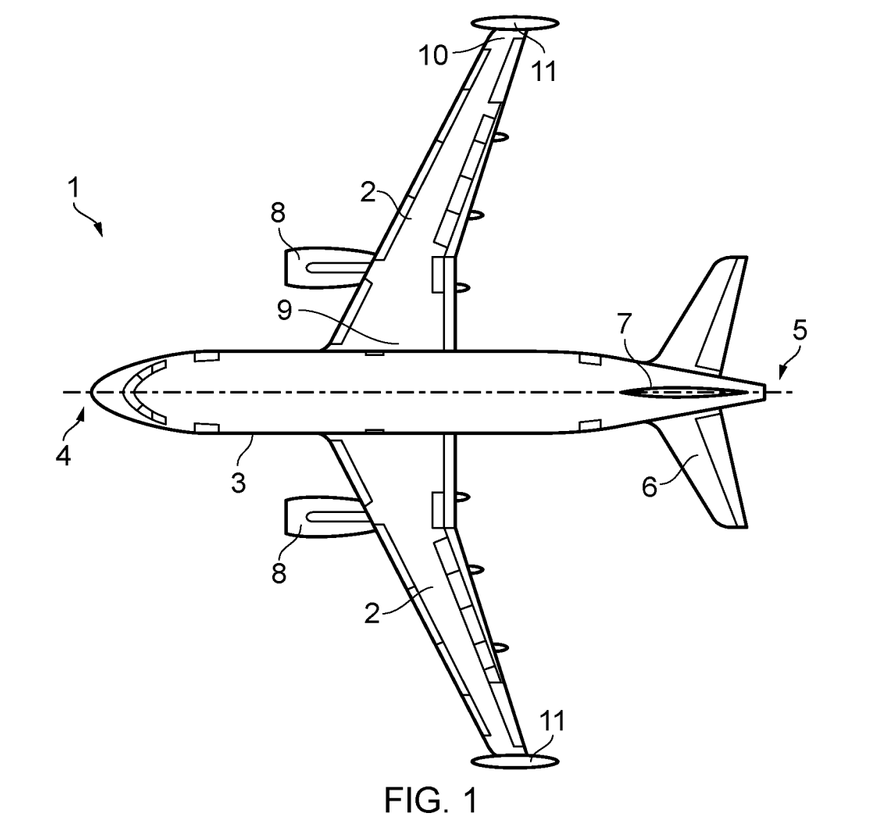
FIG. 1 illustrates a plan view of an aircraft having wing tip fuel tanks.

FIG. 1 illustrates a plan view of an aircraft 1 having wings 2 connected to a fuselage 3. The wings 2 are the main lift generating surfaces for the aircraft and so the aircraft structure has at least a part capable of generating lift. The aircraft 1 has a nose 4 and a tail 5. Adjacent to the tail 5 are horizontal and vertical stabilisers 6, 7 attached to the empennage portion of the aircraft fuselage 3. The aircraft 1 has under-wing mounted engines 8. Each wing 2 and the horizontal and vertical stabiliser surfaces 6, 7 have a variety of flight control surfaces including spoilers, flaps, ailerons, elevators, rudder, etc., although depending on the aircraft configuration a variety of different flight control surfaces including those not listed here may be adopted. The aircraft 1 shown is a fixed wing jet passenger aircraft, although in other examples the aircraft may be any aircraft type, including fixed or rotary wing, civil or military, passenger, cargo, general aviation, manned or unmanned, etc. without limitation.

Each of the wings 2 has a root end 9 adjacent to the fuselage 3 and a tip end 10 opposite the root end. Mounted at the tip end 10 of each wing 2 is a wing tip fuel tank pod 11. The tip tanks 11 are arranged to carry an additional fuel volume to supplement the fuel volume contained within the main fuel tanks inside the wings 2. The tip tanks 11 may therefore extend the operational range of the aircraft 1 and may be detachable such that the tip tanks 11 may be used for only certain flight missions and may be removed for other flight missions where the additional fuel volume is not required.

Beneficially, the tip tanks 11 may remain full of fuel towards the end of a flight mission, when the majority of the fuel held in the main wing tanks has been used by the main engines 8. Keeping a relatively heavy mass at the tip end 10 of the wings 2 may be desirable in some circumstances to counteract the aerodynamic lift of the wings 2, thereby reducing wing bending moments, particularly at the root end 9, and/or torque or shear force. However, under other conditions the relatively heavy mass of the tip tanks 11 may actually be undesirable and may lead to an increase in the wing bending moment, torque or shear.

Figure 2:
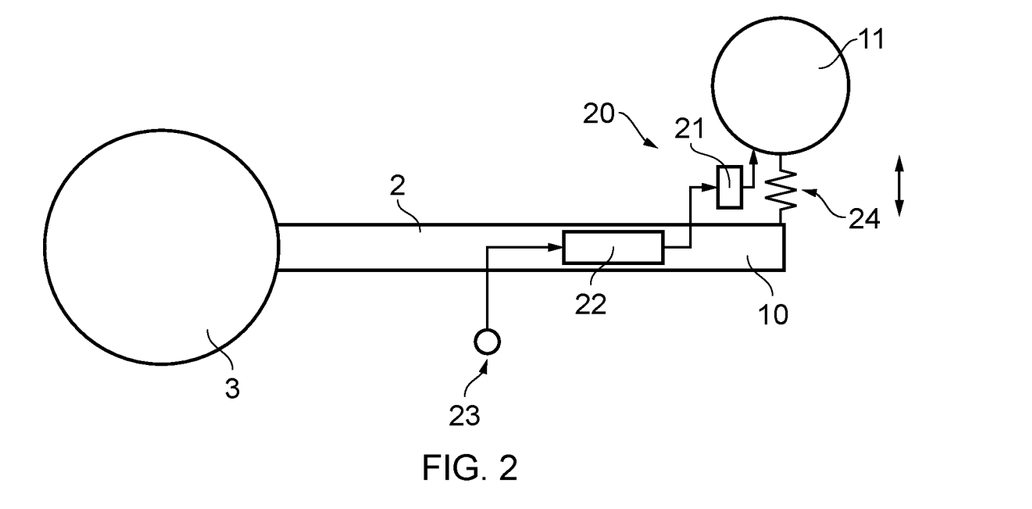
FIG. 2 illustrates schematically a wing tip mounted body attached to the wing by an active support according to a first example.

As shown in FIG. 2 an active support 20 is used to mount the wing tip tank 11 to the wing 2. In the illustrated example the wing tip tank 11 is an example of a body having a mass. In the following discussion the tip tank 11 is intended purely as one example of a body having a mass, and the comments may apply similarly to other bodies having a mass. The wing tip tank 11 is movably mounted to a portion of the aircraft structure, which in the illustrated example is the tip end 10 of the wing 2. In the following discussion the tip end 10 of the wing 2 is intended purely as one example of a portion of the aircraft structure, and the comments may apply similarly to other portions of the aircraft structure.

The active support 20 includes an actuator 21 configured to move the tip tank 11 relative to the tip end 10 of the wing 2. A controller 22 is connected (e.g. electrically) to a sensor 23 and to the actuator 21. The sensor 23 is configured to output a signal representative of a dynamic input. The sensor may be an air pressure sensor, a position sensor, an accelerometer, an air densitometer, an angle of attack vane, strain gauge, etc. without limitation. The dynamic input is a signal representative of an air pressure external to the aircraft 1, a position (either of the aircraft 1 in three dimensional space, or a part of the aircraft relative to some other part of the aircraft), an acceleration (either of the aircraft as a whole or a portion of the aircraft), a density of ambient air external to the aircraft, an angle of attack of the whole or part of the aircraft relative to the freestream flow, or a strain acting on one or more parts of the aircraft.

The controller 22 is configured to receive the dynamic input signal from the sensor 23 and to output a command for the actuator 21 to move the wing tip tank 11 relative to the tip end 10 of the wing 2.

The active support 20 is configured to provide a range of movement for the tip tank 11 in at least one degree of freedom and the actuator 21 is configured to move the tip tank 11 across the entire range of movement in that one degree of freedom in a period of time that is less than three seconds. The actuator 21 is configured to move the tip tank 11 sufficiently rapidly to generate an inertial force (due to the mass of the tip tank and its contents) that is equal to or greater than any aerodynamic force generated by the tip tank 11 during that movement of the tip tank 11 by the actuator 21.

The one or more degrees of freedom provided by the active support 20 may include a translation and/or rotation of the tip tank 11 relative to the tip end 10 of the wing 2. For example, the tip tank 11 may be configured to permit movement of the tip tank 11 or about one or more orthogonal axes. For example, the tip tank 11 may be constrained for movement vertically and or horizontally relative to the motion of the wing 2. An optional spring 24 is shown coupled between the tip tank 11 and the tip end 10 of the wing 2. The spring 24 is adapted to bias the tip tank 11 relative to the tip end 10 of the wing 2. The function of the spring 24 may be incorporated in the actuator 21, or alternatively the biasing action of the spring 24 may be provided in addition to a biasing spring action within the actuator 21.

Operation of the schematic example illustrated in FIG. 2 will now be described in the context of controlling the inertial response of the tip tank 11 to a gust load. The sensor 23 may be, for example, either an accelerometer mounted somewhere on the aircraft 1, an air pressure sensor mounted near the nose 4 of the aircraft 1, or a forward looking air densitometer such as a LIDAR sensor, or angle of attack vane mounted near the nose 4 of the aircraft 1, or a strain gauge mounted somewhere on the structure of the aircraft 1. Any sensor capable of sensing a wind gust load may be used for this purpose.

Regardless of which type of sensor is deployed the sensor 23 is adapted to detect a wind gust either before it has an effect on the aircraft 1, or whilst the wind gust is acting on the aircraft 1. The wind gust typically acts to increase or decrease the lift generated by the wing 2. This change in lift acting on the wing 2 will change the wing bending moment. To counteract the aerodynamic load acting on the wing 2 due to the gust the controller 22 using the input from sensor 23 calculates a desired response of the active support 20 to counteract the load acting on the wing 2 due to the wind gust.

The controller 22 controls the movement of actuator 21 to move the wing tip tank 11 relative to the tip end 10 of the wing 2. Since the tip tank 11 and its contained fuel volume has a significant mass, moving the tip tank 11 relative to the tip end 10 of the wing 2 generates an inertial force. It will be appreciated that since the tip tank 11 is in the airflow around the aircraft, moving the tip tank 11 will also generate some aerodynamic force as a result of the movement of the tip tank 11 relative to the tip end 10 of the wing 2. However, the inertial force generated by movement of the tip tank 11 by the actuator 21 is at least equal to or greater than (and may be significantly greater than, e.g. an order of magnitude greater) the aerodynamic force generated by the tip tank 11 during that movement of the tip tank 11.

The magnitude of the inertial force generated by movement of the tip tank 11 relative to the tip end 10 of the wing 2 is proportional to the acceleration of the tip tank 11 during that movement. Therefore, the actuator 21 is configured to move the tip tank 11 sufficiently rapidly to generate the inertial force required to counteract in whole or in part the aerodynamic force generated by the wind gust. To ensure that the actuator 21 can move the tip tank 11 sufficiently rapidly to generate this inertial force, the actuator 21 is configured to move the tip tank 11 across the entire range of movement in the at least one degree of freedom provided by the active support 20 in a time period of less than three seconds. This time period is similar to the typical duration of a wind gust event which is typically in the region of one to five seconds. During the wind gust event the direction of the wind acting on the aircraft may exert a force in two opposing directions, e.g. upwards and downwards. In this way, the active support 20 can control the movement of the significant mass of the tip tank 11 to effectively counteract the wind gust.

The controller 22 and sensor 23 may form part of a flight control system (FCS) of the aircraft 1. The FCS may include a plurality of the sensors 23 of the one or more types described above and may be connected to the pilot or auto pilot controls of the aircraft and also to the various flight control surfaces of the aircraft. In this way, the FCS may provide the gust load alleviation as a combination of movement of the aircraft flight control surfaces and the inertial response of the mass of the wing tip tank 11. In an alternative example, the FCS may be provided separately from the controller 22. It is intended that the controller 22 is configured to control the inertial response of the wing tip tank 11 independent of a pilot controlled input, although the pilot or auto pilot may activate or deactivate the controller 22.

It will be appreciated that whilst in the example illustrated in FIG. 2 the active support 20 provides a range of movement for the wing tip tank 11 in a single degree of freedom, i.e. substantially vertically, in other examples the active support 20 may be configured to provide a range of movement for the body in a plurality of degrees of freedom up to a maximum of six degrees of freedom. In a further alternative example the active support 20 may be used to mount a plurality of bodies each having a respective mass and in that example the number of degrees of freedom provided by the active support 20 may be greater than six.

Considering the relatively rapid movement of the tip tank 11 by the actuator 21 it is expected that the mass of the tip tank 11 (including its fuel volume) is kept substantially constant. The mass of the tip tank 11 may be maintained substantially constant at least during the three second time period, and preferably the mass of the wind tip tank 11 is kept substantially constant for at least a duration an order of magnitude greater than this three second time period.

Whilst in the above described example the dynamic input is representative of an aerodynamic gust load acting on the aircraft 1 and the inertial response of the wing tip tank 11 to counter that wind gust, it will be appreciated that the active support 20 may be configured to generate an inertial force by movement of the tip tank 11 in response to other aerodynamic loads or ground loads acting on the aircraft, e.g. during a manoeuvre whether in flight or on the ground, or upon landing.

Figure 3:
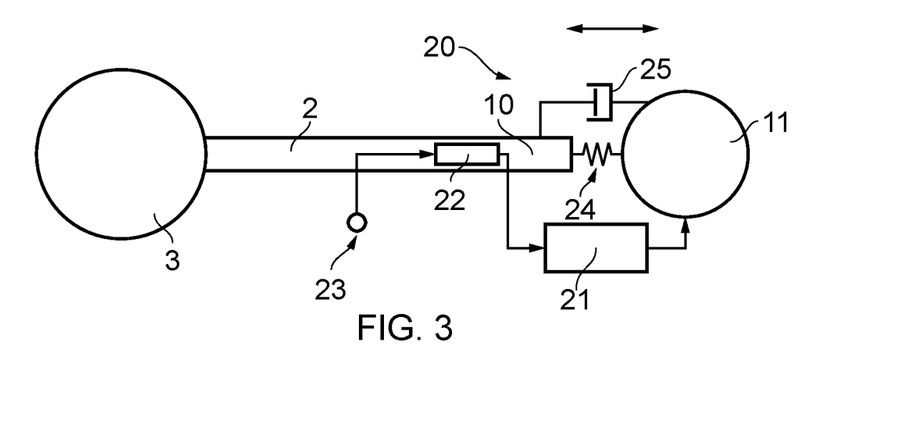
FIG. 3 illustrates schematically a wing tip mounted body attached to the wing by an active support according to a second example.

FIG. 3 shows a modification of the example described above with reference to FIG. 2 which differs only in that a damper 25 is connected between the tip tank 11 and the tip end 10 of the wing 2, and in that the degree of freedom of the active support 20 is substantially horizontal as different than the substantially vertical degree of freedom shown in FIG. 2. It will be appreciated that these two differences between the examples shown in FIGS. 2 and 3 are independent and the damper 25 may be used regardless of the direction or number of degrees of freedom provided by the active support 20 and vice versa. The damper 25 acts to dissipate kinetic energy. The damper 25 may either be provided as a separate component to the actuator 21 as shown in FIG. 3, or a damping function may be incorporated within the actuator 21. In a further example the actuator 21 may provide a damping function in addition to the separate damper 25.

Whilst in the above described examples the body mounted by the active support 20 is a wing tip tank 11, it will be appreciated that the body may be other than a wing tip tank. Examples of other bodies may include an auxiliary fuel tank or podded fuel tank, or a main engine mounted either below or above the wing.

Figure 4:
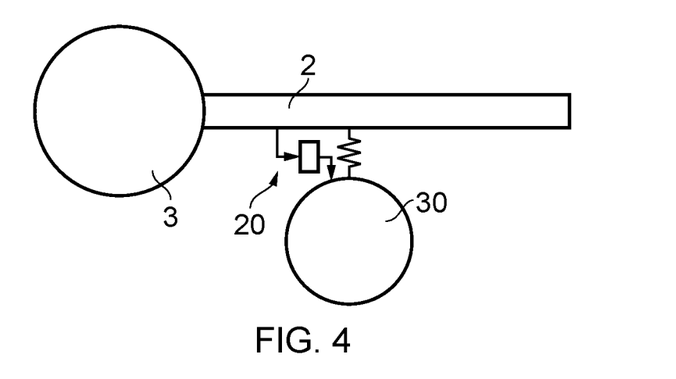
FIG. 4 illustrates schematically a body attached below the wing by an active support according to a third example.
Figure 5:
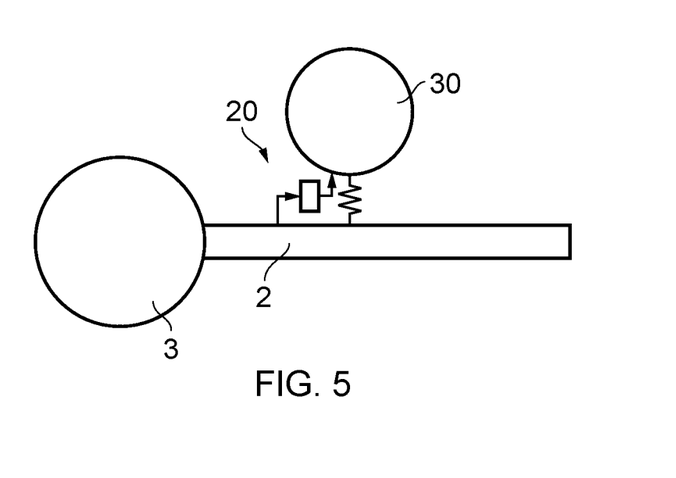
FIG. 5 illustrates schematically a body attached above the wing by an active support according to a fourth example.

FIG. 4 illustrates an example in which a podded or auxiliary fuel tank 30 is mounted below the wing 2 and FIG. 5 illustrates schematically an example in which a podded or auxiliary fuel tank 30 is mounted above the wing 2. In both FIGS. 4 and 5 the active support 20 and variants thereof may be the same as those described above with reference to FIGS. 2 and 3.

In further examples, not shown in the figures, the body mounted to the aircraft structure by the active support may be an auxiliary power unit housed in the empennage or near the tail 5 of the aircraft 1, a landing gear mounted to the underside of the wings 2 or the fuselage 3, or payload carried within the fuselage 3 of the aircraft 1.

The variety of bodies having a mass, including those listed above, which may be movably mounted to a portion of the aircraft structure by an active support is not to be construed as limited to the examples given in FIGS. 2-4 above and other examples will be appreciated by those skilled in the art.

As will be apparent from this exemplary list of bodies having a mass which may be connected by the active support, the position of the mass does not need to be at the tip of the wing 2, although this is typically the area with the largest deflection for a fixed wing aircraft. The mass could be positioned above or below the wing anywhere along its length (span).

To minimize undesirable shifts in the centre of gravity of the aircraft 1 (including local wing effects) it may be desirable to constrain one or more of the degrees of freedom provided by the active support 20. For example, preload could be applied to the spring 24 to prevent deflection below a specified load level. Uses of hinges, rails, spigots and pin joints could be used to constrain the deflection of the mass in one or more directions (translation or rotation).

Figure 6:
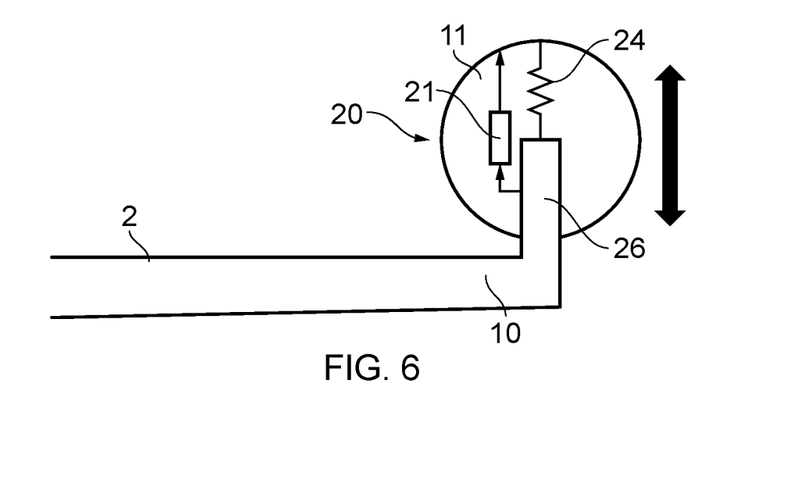
FIG. 6 illustrates schematically a wing tip mounted body attached to the wing by an active support according to a fifth example.

In the example depicted FIG. 6, which for purely exemplary purposes is again a wing tip tank 11 connected to the tip end 10 of the wing 2, one or more spigots may provide restraint in all directions except for deflections along the axis of the spigot 26. This would allow the mass of the wing tip tank 11 to remain in position to reduce the impact of aircraft centre of gravity when deflections occur. The optional spring 24 and damper 25 (not shown in FIG. 6), if provided, could then be aligned to the spigot axis to manage relative deflection.

Figure 7:
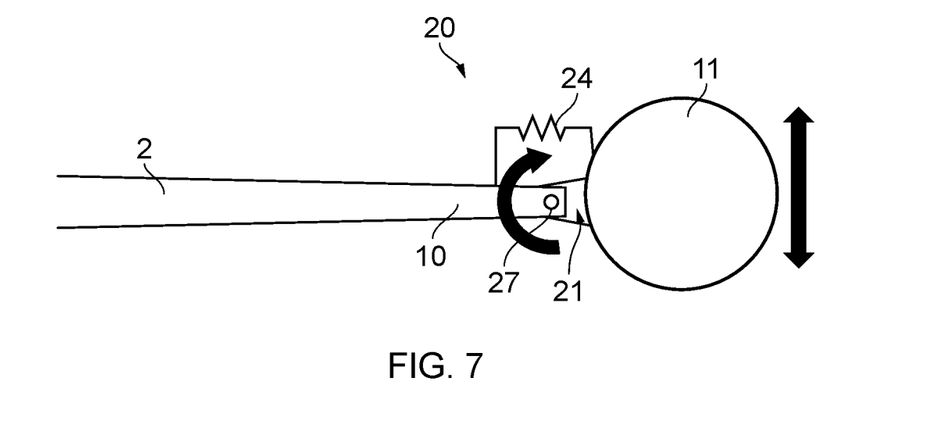
FIG. 7 illustrates schematically a wing tip mounted body attached to the wing by an active support according to a sixth example.

Similarly, a hinge would constrain deflection but permit rotation around its axis. A linear or rotational spring/damper could be used to manage rotation, as shown in FIG. 7. The actuator 21 of the active support 20 is a rotary actuator in the example shown in FIG. 7 as different than the linear actuators 21 described previously. The hinge 27 allows rotation only about a substantially horizontal (chordwise extending) axis in the configuration shown in FIG. 7, which rotation at the hinge 27 creates vertical deflection of the wing tip tank 11.

As described previously, the wing tip tank 11 is only one example of a body having a mass mounted by the active support 20 and the configuration shown in FIG. 7 may be particularly well suited to a variant (not shown) in which the body having the mass is a folding wing tip connected to the wing 2 by the hinge 27. The folding wing tip may be used to reduce the aircraft span when the aircraft is on the ground to meet gate limits, for example.

Figure 8:
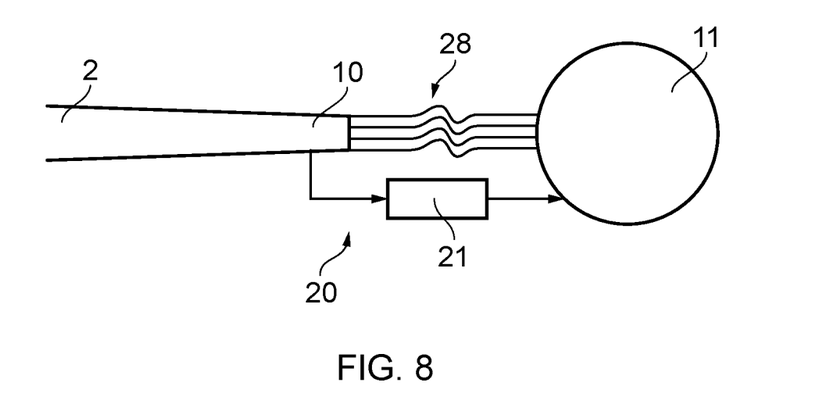
FIG. 8 illustrates schematically a wing tip mounted body attached to the wing by an active support according to a seventh example.

In a further example shown in FIG. 8 the tip tank 11 or other body is connected to the aircraft structure such as the tip end 10 of the wing 2 by a variant of the active support 20 in which the support is configured as a linear cantilever 28. The linear cantilever may be a 'leaf spring' style connection, such as using semi-flexible carbon fibre beams or similar. This would provide a good level of constraint between the mass of the tip tank 11 and the wing 2, but allow deflection between them in the same manner as a leaf spring.

The actuator 21 and its control may be as described previously in any of the FIGS. 6-8.

An active damper can also be used between the mass of the body and the aircraft structure. This would allow the magnitude of damping to be varied, in conjunction with the flight control system requirements to allow optimal displacement (and rate of displacement) of the mass relative to the aircraft structure to further mitigate load increases through the flight regime. Similarly a variable gas pressure spring (or progressive rate spring) could be used to tailor the dynamic response as the mass of the system changes in flight.

If the mass was provided by a fuel volume, it is likely that the mass will decrease during operation of the aircraft. The mass of the aircraft will also evolve during flight as the fuel contained within the main wing tanks is consumed by the engines, so it may be appropriate to match the mass, spring rate and damping to the aircraft condition. This could be achieved by transferring fuel in/out of the wing tip tank 11, adapting the damping and varying the spring rate, or limiting deflection, possibly using the actuator 21.

Figure 9:
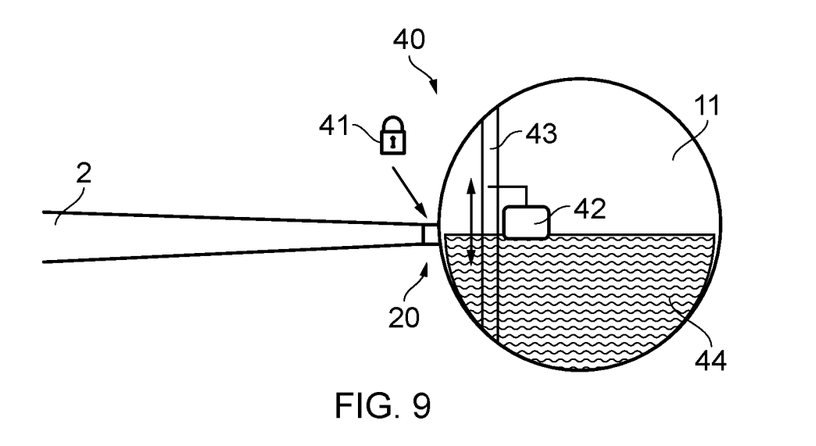
FIG. 9 illustrates schematically a body attached to the wing by an active support having a releasable locking mechanism according to an eighth example.

There are circumstances where a selective rigid connection may be required between the body having the mass and the aircraft structure. As shown in FIG. 9 a locking system 40 may be used to restrain the tip tank 11, or limit degrees of freedom provided by the active support 20, under specific circumstances (e.g. crash cases, low fuel volume or systems failure cases). A latch 41 may be provided with the active support 20. A float 42 on a sliding rail 43 may be used to sense when the level of fuel 44 within the tip tank 11 reaches one or more predetermined levels. When the level of fuel within the tip tank 11 is above a predetermined level the latch 41 is unlatched enabling the active support 20 to provide its full range of movement for the tip tank 11 in at least one degree of freedom. When the level of fuel 44 within the tip tank 11 falls below a predetermined value the latch 41 is latched to restrain further relative deflection between the tip tank 11 and the wing 2. When the latch 41 is latched the active support becomes a substantially rigid connection. The latch may be electrical or mechanical and may be linked to the flight control system or flight computers. Activation of the latch 41 may also be pilot or auto pilot controlled. This locking system 40 may be applied to any of the above described examples.

Figure 10:
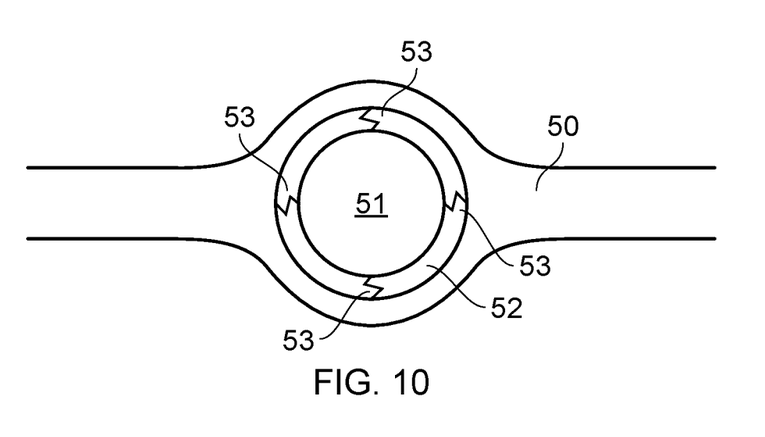
FIG. 10 illustrates schematically a body attached within a fairing of the aircraft structure by an active support according to a ninth example.

To minimise the aerodynamic disturbance of the mass moving around relative to the wing, a faired installation may be appropriate, as shown in FIG. 10. A part of the aircraft structure 50 would encapsulate the body 51 having the mass and have a desirable external shape (such as an aerofoil or other lifting surface). Within the structure 50 a gap 52 exists between the body 51 and structure 50, such that a system of active supports 53 suspend the body 50. The gap 52 allows relative deflection of the body 51 relative to the structure 50. The system active supports 53 may include an optional spring/damper and be controlled in a similar manner to the above described embodiments.

A further benefit of this configuration is the limit to deflection provided by the gap 52 closing between the body 51 and the structure 50. At high load levels, direct contact between the two would eliminate the relative deflection and secure the elements together, which may be useful for a crash case, for example.

A different practical realisation of the same concept could be achieved by filling the gap 52 between body 51 and the structure 50 with a fluid. The fluid may be a gas or liquid and the pressure and viscosity, for example, could be chosen to adjust the mechanical characteristic of such a system.

Figure 11:
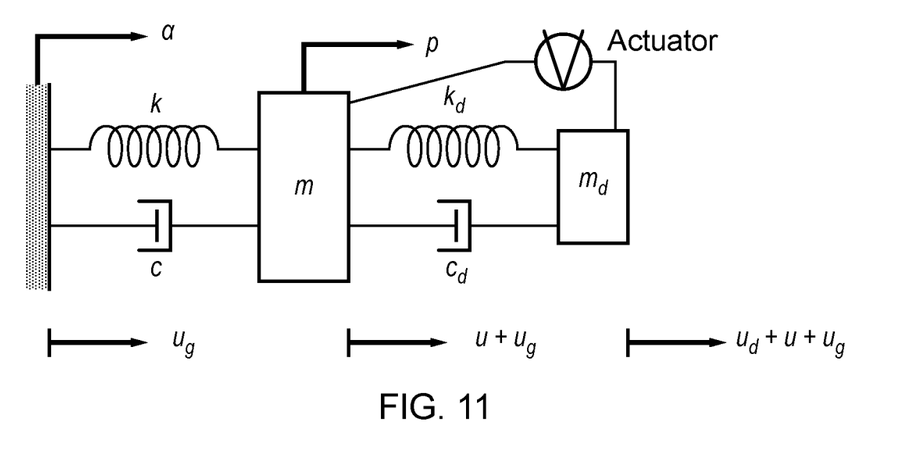
FIG. 11 illustrates a free body diagram of the body attached to the aircraft structure by the active support.

A free body diagram for a purely exemplary system comprising an aircraft fuselage, wing and tip tank responding a vertical gust excitation is represented in FIG. 11, with the vertical displacement shown along the horizontal axis for convenience.

Where:
m, k and c are the mass, stiffness and structural damping of the wing,
md, kd and cd are the mass, stiffness and structural damping of the tip tank system (damper),
ug, u and ud are the relative displacements of the fuselage ("ground"), the wing and the tip tank (damper),
a is the fuselage (ground) acceleration and p is an external force applied to the wing.

The acceleration due to the gust "a" is applied to the fuselage (considered as the "ground" of the system). The external force "p", representing the change in lift due to the gust, is applied to the wing. Accelerations for the various components of the system can be computed by successive derivations of the displacement time histories.

An equivalent representation can be setup with rotational springs, considering moments of inertia and rotational displacements in place of masses and linear displacement.

Figure 12:
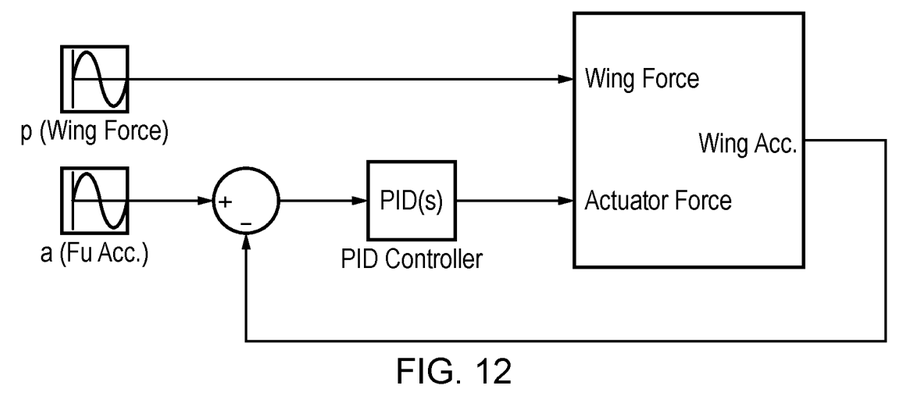
FIG. 12 illustrates a control strategy for the active support.

The actuator within the active support aids the natural restoring force due to the elastic connection between wing and the tip tank (damper). The control strategy proposed for the system is presented diagrammatically in FIG. 12. A feedback control loop is established between the acceleration, a, input due to the gust (at the fuselage), and acceleration on the wing, p, output by the mechanical system. The aim of the PID controller(s) is to minimise the difference between those input/output accelerations, in effect limiting (or eliminating) the effects of wing flexibility during the dynamic response to the gust.

Where the word or appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft comprising a structure at least part of which is capable of generating aerodynamic lift, and a body exposed to airflow over the aircraft and having a mass movably mounted to a tip end of a wing of the structure by an active support,
wherein the active support includes an actuator configured to move the body relative to the tip end of the wing of the structure, and a controller for controlling movement of the actuator in response to a dynamic input,
wherein the active support is configured to provide a range of movement for the body in at least one degree of freedom, and the actuator is configured to move the body across the entire range of movement in said at least one degree of freedom in a time period of less than 3 seconds, and
wherein the controller is configured to control the movement of the actuator to move the body sufficiently rapidly to generate an inertial force that is equal to or greater than the aerodynamic force generated by the body on the body during that movement of the body.

2. An aircraft according to claim 1, wherein the body includes one or more of: a wing tip fuel tank, auxiliary fuel tank, podded fuel tank, a main engine, an auxiliary power unit, a landing gear, a wing tip device or payload of the aircraft.

3. An aircraft according to claim 1, wherein the dynamic input is a signal from a sensor mounted to the aircraft.

4. An aircraft according to claim 3, wherein the sensor is one or more of: an air pressure sensor, a position sensor, an accelerometer, an air densitometer, an angle of attack vane or strain gauge.

5. An aircraft according to claim 1, wherein the active support is configured to provide a range of movement for the body in up to six degrees of freedom.

6. An aircraft according to claim 1, wherein the mass of the body is substantially constant.

7. An aircraft according to claim 6, wherein the mass of the body is substantially constant either during the 3 second time period or for at least a duration of greater than the 3 second time period.

8. An aircraft according to claim 1, wherein the dynamic input is representative of an aerodynamic load or a ground load acting on the aircraft, or of an unbalanced dynamic load generated by a part of the aircraft.

9. An aircraft according to claim 1, wherein the dynamic input is an aerodynamic gust load.

10. An aircraft according to claim 1, wherein the controller is configured to provide loads alleviation for the structure of the aircraft.

11. An aircraft according to claim 1, wherein the aircraft has a passenger cabin, and the controller is configured to reduce the magnitude of external loads on the structure that are imparted to the passenger cabin.

12. An aircraft according to claim 1, wherein the aircraft is a fixed or rotary wing aircraft.

13. The aircraft of claim 1, wherein the mass is directly movably mounted to the tip end of the wing.

14. The aircraft of claim 1, wherein the dynamic input is representative of a load acting on the aircraft, and wherein the actuator is configured to move the body sufficiently rapidly to generate an inertial force so as to counteract the load acting on the aircraft.

15. A method of reducing loads on an aircraft structure having at least a part capable of generating aerodynamic lift, and a body exposed to airflow over the aircraft and having a mass movably mounted to a tip end of the wing of the structure by an active support, wherein the active support includes an actuator configured to move the body relative to the tip end of the wing of the structure, wherein the active support is configured to provide a range of movement for the body in at least one degree of freedom, and the actuator is configured to move the body across the entire range of movement in said at least one degree of freedom in a time period of less than 3 seconds, the method comprising moving the body relative to the tip end of the wing of the structure in response to a dynamic input and sufficiently rapidly to generate an inertial force equal to or greater than the aerodynamic force generated by the body on the body during that movement of the body.

16. A method according to claim 15, wherein the dynamic input is representative of an aerodynamic load or a ground load acting on the aircraft, or of an unbalanced dynamic load generated by a part of the aircraft.

17. A method according to claim 15, wherein the dynamic input is an aerodynamic gust load sensed a distance in front of and/or at any point on the aircraft.

18. A method according to claim 15, which provides loads alleviation for the structure of the aircraft.

19. A method according to claim 15, wherein the aircraft has a passenger cabin, and the method reduces the magnitude of external loads on the structure that are imparted to the passenger cabin.

20. A method according to claim 15, wherein the dynamic input is either received from a sensor forming part of a loads alleviation system coupled to one or more flight control surfaces of the aircraft or is a pilot controlled input.

21. The method of claim 15, wherein the mass is directly movably mounted to the tip end of the wing.

22. The method of claim 15, wherein the dynamic input is representative of a load acting on the aircraft, and wherein moving the body relative to the tip end of the wing counteracts the load acting on the aircraft.

* * * * *